United States Patent [19]
Kim et al.

[11] Patent Number: 5,859,682
[45] Date of Patent: Jan. 12, 1999

[54] METHOD FOR MANUFACTURING LIQUID CRYSTAL CELL USING LIGHT

[75] Inventors: Jong Hyun Kim; Ki Hyuk Yoon; Joung Won Woo, all of Seoul; Mi Sook Nam, Anyang; Yoo Jin Choi, Kyungki-Do, all of Rep. of Korea

[73] Assignee: LG Electronics Inc., Seoul, Rep. of Korea

[21] Appl. No.: 713,735
[22] Filed: Sep. 13, 1996

[30] Foreign Application Priority Data

Dec. 29, 1995 [KR] Rep. of Korea ............... 67315/1995

[51] Int. Cl.⁶ .................. G02F 1/1337; G02F 1/1341
[52] U.S. Cl. ............... 349/124; 349/128; 349/129; 349/136; 349/191; 349/189
[58] Field of Search .................. 349/124, 126, 349/128, 129, 135, 191, 136, 189; 428/1; 430/20

[56] References Cited

U.S. PATENT DOCUMENTS

| | | | |
|---|---|---|---|
| 3,947,185 | 3/1976 | Maezawa | 349/189 |
| 5,109,293 | 4/1992 | Matsunaga et al. | 349/189 |
| 5,437,813 | 8/1995 | Akashi et al. | 349/123 |
| 5,464,669 | 11/1995 | Kang et al. | 349/124 |
| 5,473,455 | 12/1995 | Koiko et al. | 349/124 |
| 5,578,351 | 11/1996 | Shashidhar et al. | 349/124 |
| 5,579,141 | 11/1996 | Suzuki et al. | 349/124 |
| 5,648,829 | 7/1997 | Yano | 349/129 |

FOREIGN PATENT DOCUMENTS

| | | |
|---|---|---|
| 0 632 311 A1 | 1/1995 | European Pat. Off. . |
| 2 281 977 | 3/1995 | United Kingdom . |
| 2281977 | 3/1995 | United Kingdom . |
| WO 95/18989 A1 | 7/1995 | WIPO . |

OTHER PUBLICATIONS

T. Hashimoto et al., "TN–LCD with Quartered Subpixels Using Polarized UV–Light–Irradiated Polymer Orientation Films", SID 95 Digest, pp. 877–880. (1995). No Date Provided.

M. Schadt et al., "Surface–Induced Parallel Alignment of Liquid Crystals by Linearly Polymerized Photopolymers", Jpn. J. Appl. Phys., 31(7):2155–2164 (1992). No Date Provided.

V.G. Chigrinov and V.M. Kozenkov, "New Results on Liquid Crystal Alignment by Photopolymerization", SPIE vol. 2408, 1995, pp. 130–140. No Date Provided.

Primary Examiner—William L. Sikes
Assistant Examiner—Tai V. Duong
Attorney, Agent, or Firm—Finnegan, Henderson, Farabow, Garrett & Dunner, L.L.P.

[57] ABSTRACT

A twisted nematic liquid crystal display which have a pixel divided into at least one is fabricated by using a UV light irradiated photo-polymer layer provided on a substrate, which includes a polysiloxane based material or polyvinylfluorocinnamate. The alignment direction and pretilt angle direction are adjusted by anchoring energy and flowing effect of liquid crystal material between substrates.

17 Claims, 8 Drawing Sheets

METHOD FOR MANUFACTURING LIQUID CRYSTAL CELL USING LIGHT

BACKGROUND OF THE INVENTION

The present invention relates to a method for manufacturing a liquid crystal cell, and more particularly to a method for manufacturing a twisted nematic(referred as TN) liquid crystal cell using an ultraviolet light irradiated an alignment layer to make two domains in each pixel, that is, each domain has a different alignment direction. Thereby, the viewing angle compensates each other so as to provide a wider viewing angle without grayscale-reversal problem.

Figure 1A:
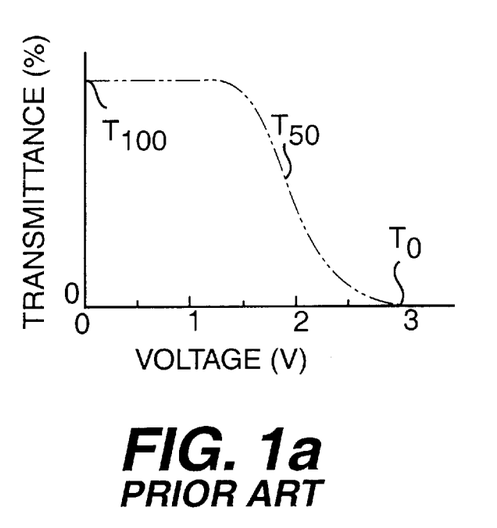
FIG. 1a a graph showing a relation between a voltage and a transmittance of the conventional twisted nematic liquid crystal cell.
Figure 1B:
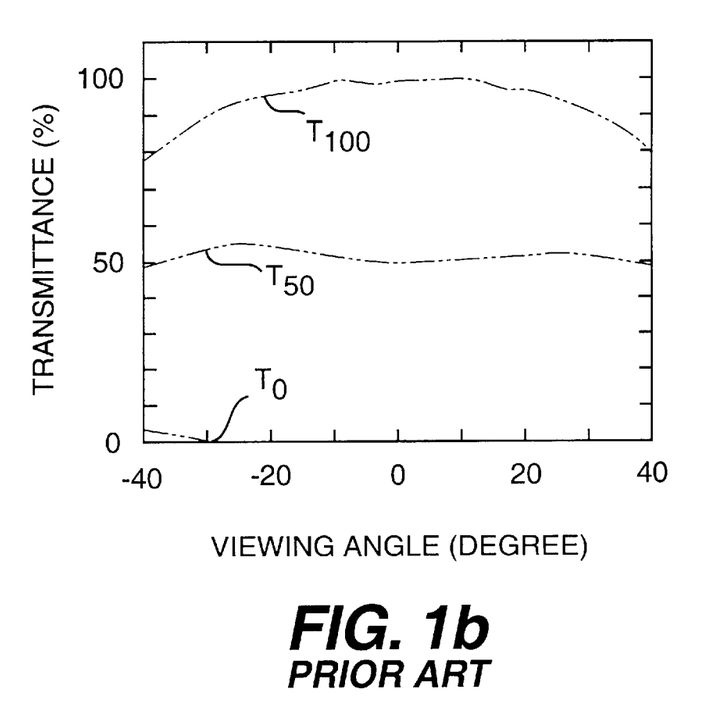
FIG. 1b a graph showing a transmittance regarding to a right and a left viewing directions of the conventional twisted nematic liquid crystal cell.
Figure 1C:
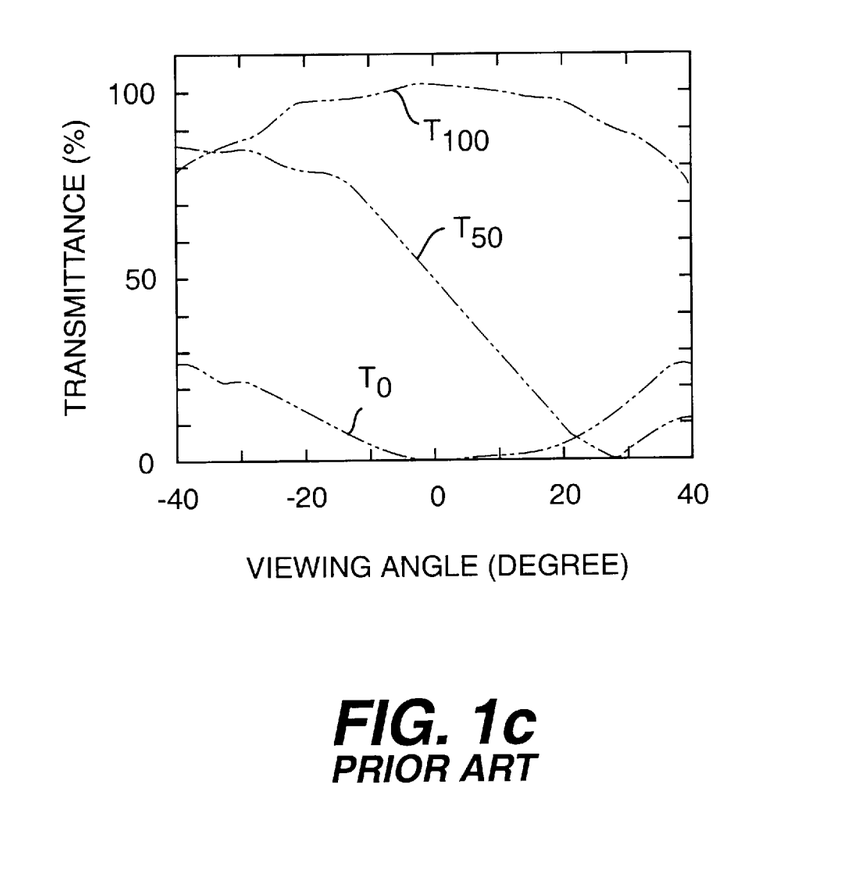
FIG. 1c a graph showing a transmittance regarding to an upper and a lower viewing direction of the conventional twisted nematic liquid crystal cell.
Figure 2:
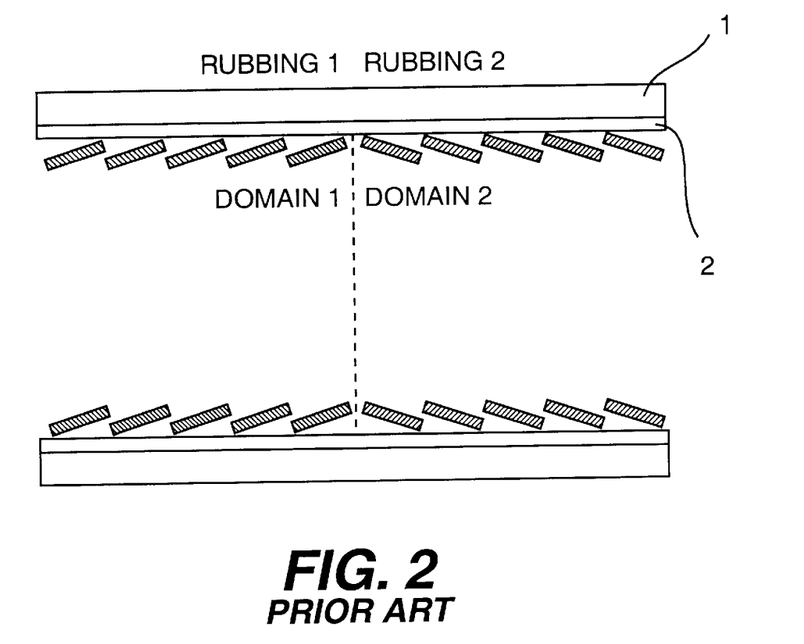
FIG. 2 is a view showing structure of two-domain TN cell.

It is well known that the TN LCD, which is now most commonly employed, has a narrow and non-uniform viewing angle causing changing a transmittance in the gray level FIG. 1a is showing the relation between the transmittance of LC cell and a voltage, FIG. 1b is showing the relation between the viewing angle in the horizontal direction and the transmittance, and FIG. 1c is showing the relation between the viewing angle in the vertical direction and transmittance. Particularly, referring to FIG. 1, while it is a symmetric transmittance between right and left viewing angle, it is asymmetric transmittance between upper and lower viewing angle. The viewing angle gets narrower because an image inversion occurs between an upper and lower viewing angle. To overcome this problem of the narrow viewing angle, two major approaches have been proposed i.e., a multi-domain TN LCD such as a two-domain TN LCD, a domain-divided TN LCD and a four-domain TN LCD, and an optical compensation using two retardation films compensated birefringence mode LCD. Referring to a structure of LC cell in FIG. 2, each pixel has two-director configuration, wherein the two directors are in the opposite direction. Applying a gray level voltage to this cell, the LC directors are tilted in opposite directions, thereby, two domains is obtained. The two-domain TN LC cell is made by the following steps: rubbing the entire alignment layer 2 coated on a substrate 1 in the first rubbing direction; making mask to block one domain by a photoresist; rubbing the other domain at the reverse direction to the first rubbing direction; and removing said photoresist. Thereby, it obtains two liquid crystal directors which are in opposite directions in each pixel.

Figure 3:
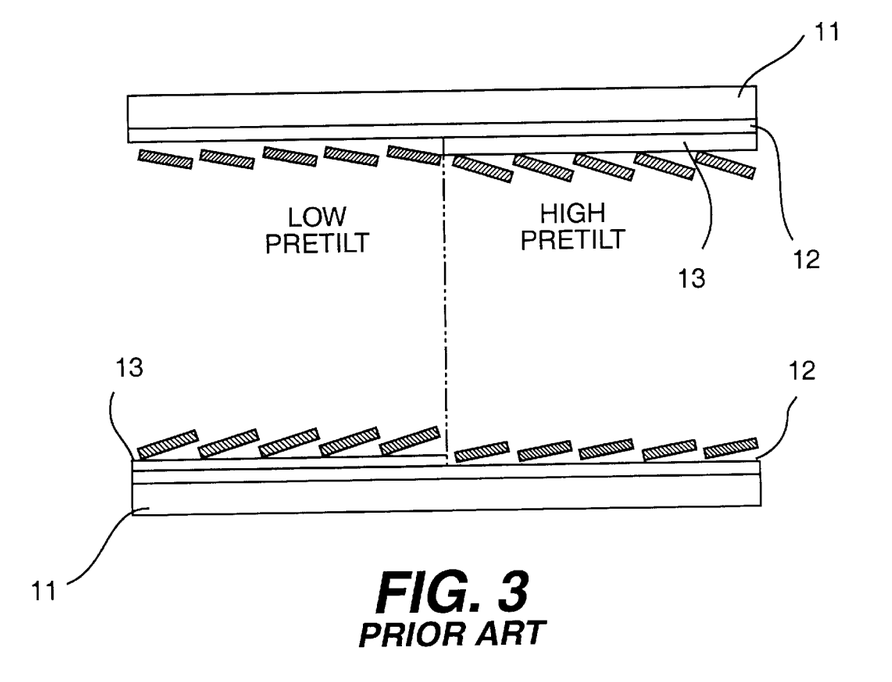
FIG. 3 is a view showing structure of domain-divided TN cell.
Figure 4A:
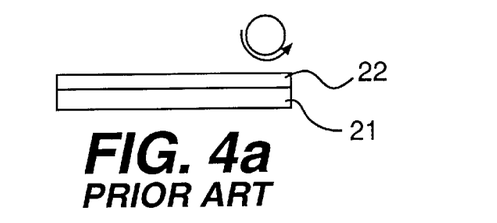
FIGS. 4a–4e illustrate steps of a reverse rubbing process of a two-domain cell.
Figure 4B:
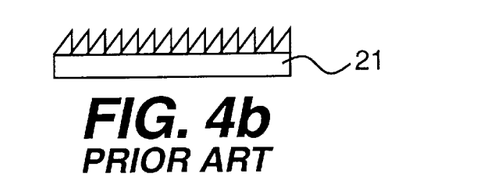
Figure 4C:
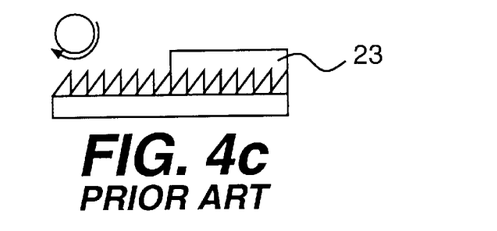
Figure 4D:
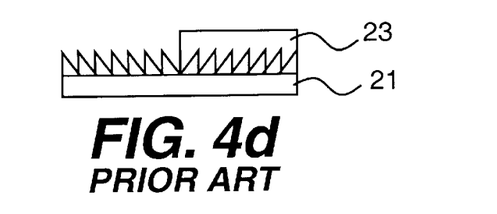
Figure 4E:
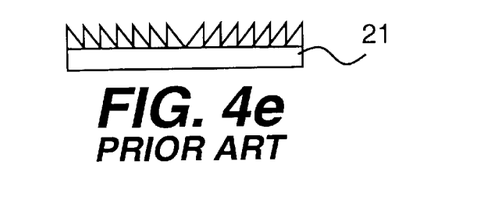
Figure 5A:
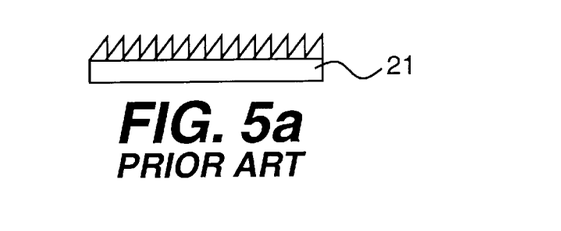
FIGS. 5a–5d illustrate steps of a double SiOx evaporation process of a two-domain cell.
Figure 5B:
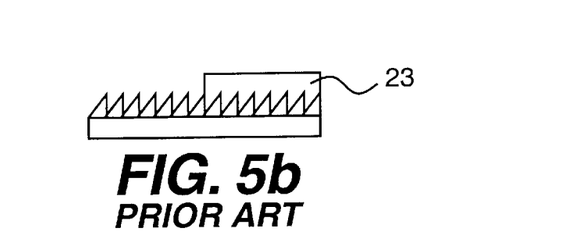
Figure 5C:
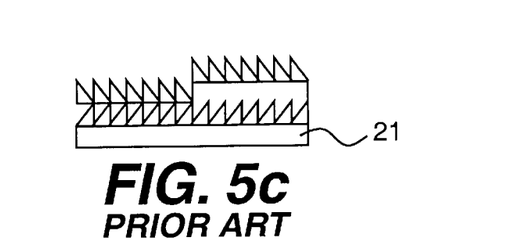
Figure 5D:
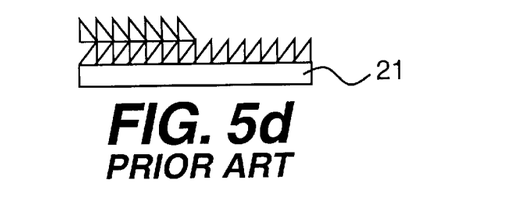

Referring to domain-divided LC cell in FIG. 3, the alignment layers 12,13 consist of two materials having different pretilt angles. The first alignment layer 12 is organic and the second alignment layer 13 is inorganic.

According to the reverse rubbing process in FIG. 4, the polyimide 22 coated substrate 21 is rubbed in the first rubbing direction, then photoresist 23 as a mask is formed on some area of the substrate 21. Then other area of the substrate 21 is rubbed in the opposite direction to the first rubbing direction and finally, the photoresist 23 is removed.

For the double SiOx oblique evaporation in FIG. 5, SiOx is evaporating the substrate with some angle, the photoresist is formed to divide a pixel. Then SiOx is evaporating in the opposite direction to the previous evaporating direction on the substrate 21 and the photoresist 23 used as a mask is removed. Thereby, two domains having the different pretilt angle each other are provided.

However, the two-domain TN and the domain-divided TN are fabricated through the rubbing process and photolithography process so the process becomes very complicated, also a particle and an electrostatic discharge are generated during the rubbing process. Therefore, the yield is decreased, or liquid crystal gets damaged.

SUMMARY OF THE INVENTION

An object of the present invention is to improve on the narrow viewing angle of TN cells and in particular to provide a method of manufacturing multi-domain TN cells using UV light.

It is other object of the present invention to provide a method for manufacturing TN liquid crystal displays to prevent the damage of LC cell, and to reduce the number of processes by means of the photo alignment on the alignment layer.

In order to achieve the object, a method for fabricating liquid crystal displays according to the present invention comprises the steps of forming the pretilt angle by irradiating ultraviolet light on alignment layers, and injecting the LC materials between said alignment layers.

DETAILED DESCRIPTION OF THE INVENTION

According to the conventional photo alignment method using an ultraviolet light suggested by Kobayashi, et. al. (SID95 DIGEST 877), the substrate coated by PVCN (polyvinylcinnamate) based materials, obtains a pretilt angle by adopting a photo-irradiation method of double exposure. That is, the alignment direction is oriented by the first UV irradiation, the second oblique irradiation with angles of 30 degree, 45 degree, and 60 degree forms a pretilt angle. However, the pretilt angle formed by this method is not desired because it is only 0.1–0.3 degree.

To obtain a larger pretilt angle in this invention, the alignment layer includes a polysiloxane based material or PVCN-F (polyvinylfluorocinnamate) which shifts the pretilt angle depending on the UV irradiation energy, so that it is possible to obtain the pretilt angle more than 45 degree.

Figure 6A:
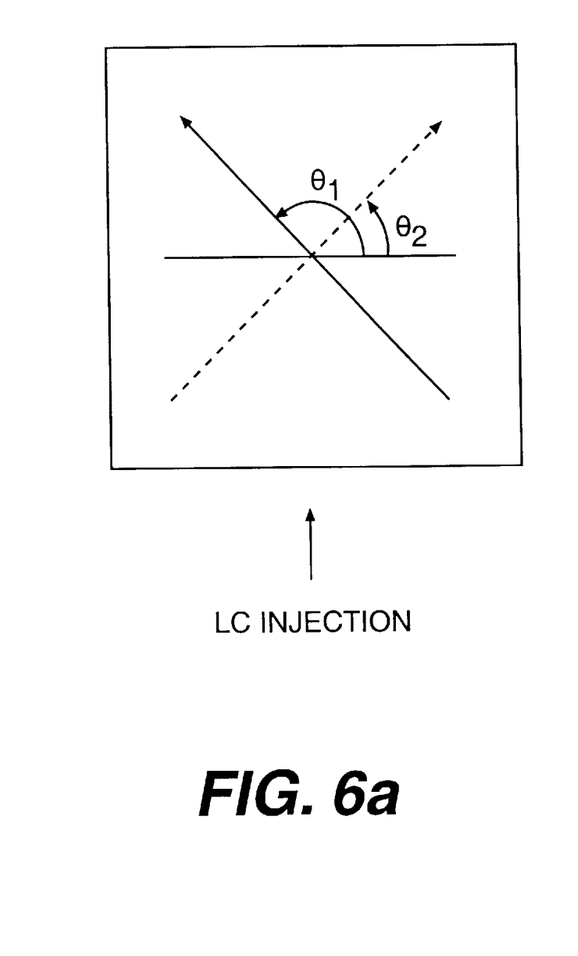
FIGS. 6a and 6b are showing a configuration of TN cell formed by photo alignment according to the present invention.
Figure 6B:
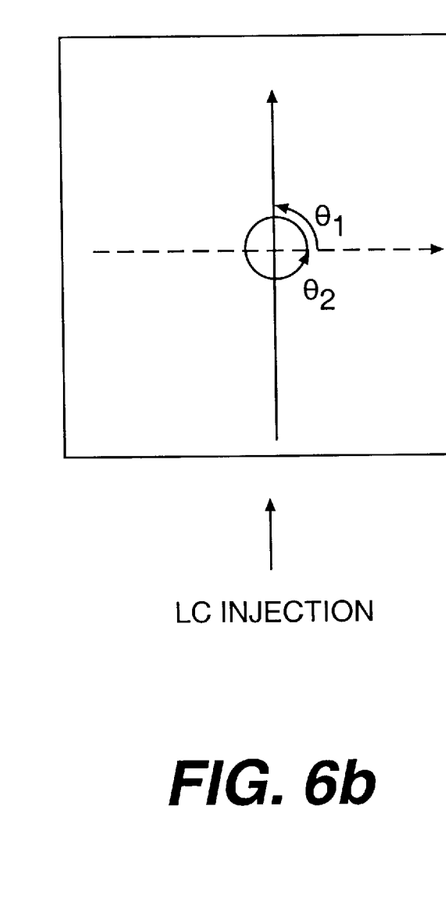

FIG. 6 is showing the TN LC configuration formed by the UV irradiation, the linearly polarized UV light irradiates photo-polymer coating the substrate to form the alignment direction, then the LC is injected to select desired pretilt angle by the flowing effect of the liquid crystal. In the figure, the solid arrow indicates the alignment direction or orientation of the upper layer, the dotted arrow indicates to the alignment direction or orientation of the lower layer. The alignment direction angle of the upper layer corresponding to a reference direction refers to θ1, and the alignment angle of lower layer corresponding to a reference direction refers to θ2. The difference between θ1 and θ2 is about 90 degree. In FIG. 6a, the alignment angle of upper layer θ1 is $90 \leq \theta_1 \leq 180$, and the alignment angle of lower layer θ2 is $0 \leq \theta2 \leq 90$, and in FIG. 6b, $0 \leq \theta1 \leq 90$, $-90 \leq \theta2 \leq 0$, respectively. The above values for $\theta_1$ and $\theta_2$, and the values for $\theta_{1-\theta4}$ in the remainder of the specification, all have units of degrees.

The liquid crystal molecules blended left-handed chiral dopant, such as S-811, is oriented to the alignment angle, and LC is injected between the upper layer and the lower layer, thereby the alignment direction and the alignment angle is selected. Although most pretilt angle is uniform by flowing effect of LC, some is not uniform. Accordingly, the uniform LC cell structure is formed by applying an electric field or thermal setting. In the case of the pretilt angle settled only by the flowing effect of the LC as in FIG. 6b, the pretilt direction of the lower layer is not uniform by itself. Even though, the pretilt angle direction of the lower layer can be determined by the anchoring energy of the upper layer which is larger than lower layer's, and the twisting power of chiral dopant mixed to the LC. The magnitude of the pretilt angle is dependent upon the incident polarized UV light intensity.

Figure 7A:
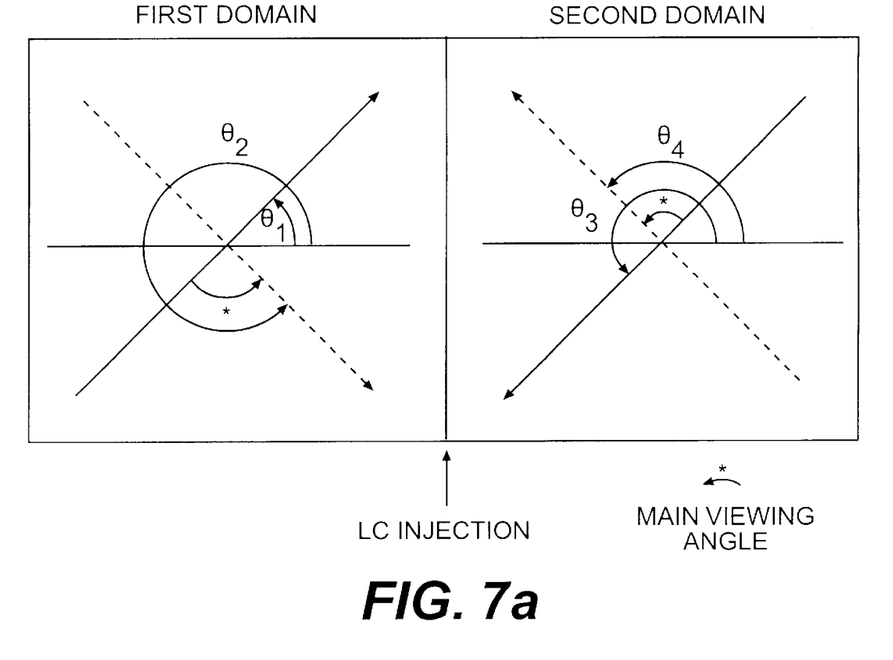
FIGS. 7a and 7b are showing a configuration of two-domain TN cell formed by photo alignment according to the present invention.

FIG. 7a is a view showing the first embodiment of a method of manufacturing the two-domain TN cell using light, it is set up $0 \leq \theta1 \leq 90$, $270 \leq \theta2 \leq 360$, $180 \leq \theta3 \leq 270$, $90 \leq \theta4 \leq 180$. The anchoring energy of the first domain upper layer and the second domain lower layer is made larger than the anchoring energy of the first domain lower layer and the second domain upper layer, then the LC cell is injected in the direction of FIG. 7a.

Figure 7B:
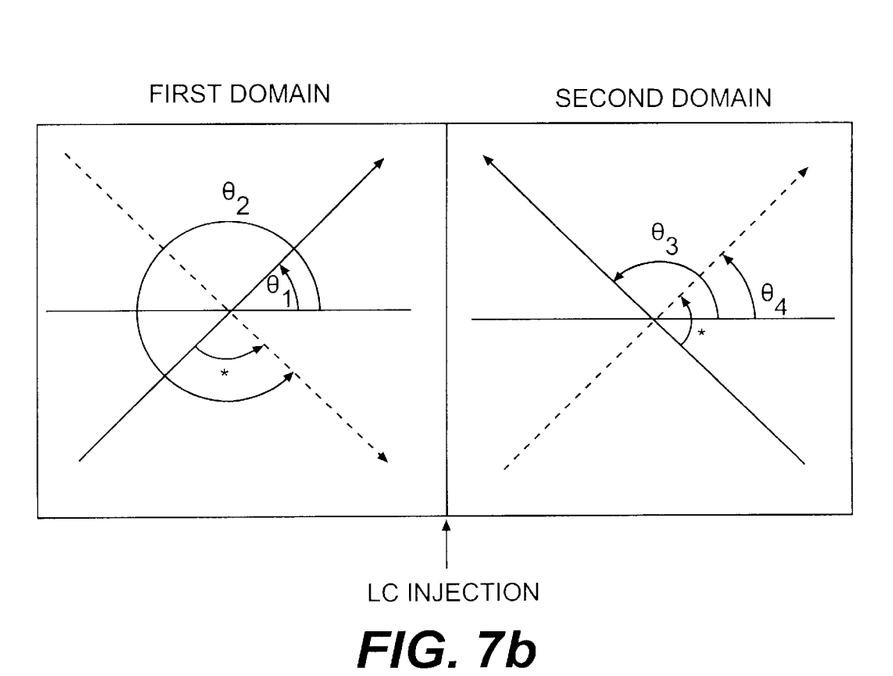

FIG. 7b is a view showing the second embodiment of the two-domain TN cell, in the first domain, upper layer alignment angle θ1 is set up $0 \leq \theta1 \leq 90$, $270 \leq \theta2 \leq 360$, for lower layer's alignment angle θ2, and in the second domain, upper layer alignment angle θ3 is set up $90 \leq \theta3 \leq 180$, $0 \leq \theta4 \leq 90$ for lower layer's alignment angle θ4. The anchoring energy of upper alignment layer is formed higher than the anchoring energy of lower alignment layer in both first domain and second domain. Then liquid crystal material is injected therebelow.

Both the upper and lower layers, the alignment direction of first domain is oriented parallel to that of the second domain, but anchoring energies of the first domain upper layer and the second domain lower layer are set up larger than anchoring energies of the first domain lower layer and the second domain upper layer. When liquid crystal molecules are injected between layers, the pretilt angle directions are determined by the flowing effect of liquid crystal molecules. The pretilt directions of the first domain upper layer and the second lower layer having larger anchoring energy are controlling the opposing pretilt direction in same domain. Thereby, the main viewing angle is set in the opposite direction between first and second domains.

In the second embodiment, the alignment directions of upper layer(θ1,θ3) and lower layer(θ2,θ4) is opposite to each other, in addition, the anchoring energies of upper layers are same each other as well as the anchoring energies of lower layers being same each other, but, the anchoring energies of upper layers are larger than the anchoring energies of lower layers. Then the liquid crystal material is injected therebelow, thereby the liquid crystal molecules are aligned in opposite direction.

Figure 8:
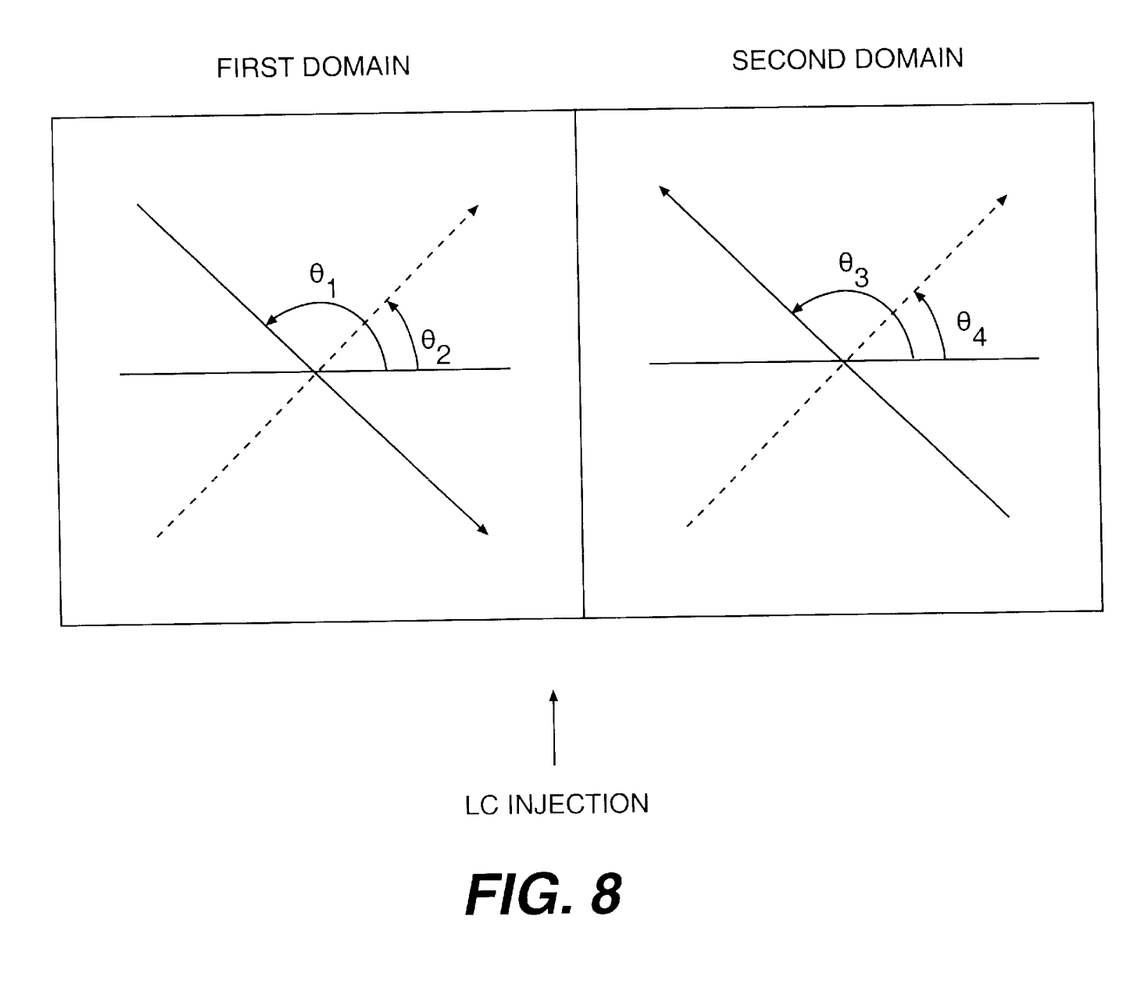
FIG. 8 is showing a configuration of domain-divided TN cell formed by photo alignment according to the present invention.

FIG. 8 is the figure showing the configuration of domain-divided TN LC cell according to the present invention. That is, the linearly polarized ultraviolet light is irradiated into the entire alignment layer to give a alignment direction, then, the first domain of the alignment layer is blocked with a mask, then the linearly polarized ultraviolet light is irradiated into the second domain to give the same alignment direction as previous alignment direction, then the mask is removed. At this time, by controlling irradiation intensity of the linearly polarized ultraviolet light, the sizes of pretilt angles formed on the alignment layer can be controlled. Thereby, the domain-divided layer which has a different pretilt in each domain, can be obtained.

The angle between the alignment direction of first domain upper layer and a reference direction or horizontal line of substrate, is θ1 and angle between the alignment direction of the first domain lower layer and the horizontal line of substrate is θ2, the angle between the alignment direction of second domain upper layer and the horizontal line of substrate, is θ3 and angle between the alignment direction of the second domain lower layer and the horizontal line of substrate is θ4. The angles constituted by alignment directions are respectively made $90 \leq \theta1$, $\theta3 \leq 180$ and the alignment direction of lower layer in the fist and $0 \leq \theta2$, $\theta4 \leq 90$, then, liquid crystal material is injected below the cell.

In this cell, although the alignment direction angles are same in upper layer(θ1,θ3), and in lower layer(θ2,θ4), the different pretilt angles are set up between domains. Then, when the LC material is injected into the LC cell, the pretilt direction is selected by flowing effect of LC material. Therefore, it is made opposite the direction of main viewing angle between first and second domains, thereby, the viewing angle will be compensated. The point above the arrow indicates the direction of main viewing angle.

The present invention provides TN LCDs in which the viewing angle is wider by composing of a plurality of domains having a different alignment direction each other when it is irradiated by the UV light, in addition, the number of processes will be reduced, so the manufacturing cost will be decreased, and damage to the LC cell caused for the rubbing process will be prevented.

While the invention has been described in its preferred embodiments, this should not be constructed as limitation on the scope of the present invention. Accordingly, the scope of the present invention should be determined not by the embodiments illustrated, but by the appended claims and their legal equivalents.

What is claimed is:

1. A method for manufacturing a twisted nematic liquid crystal display device including a first alignment layer provided on a first substrate and a second alignment layer provided on a second substrate, said method comprising:
   irradiating said first alignment layer with a first polarized UV light to impart a first alignment direction to said first alignment layer;
   irradiating said second alignment layer with a second polarized UV light to impart a second alignment direction to said second alignment layer; and
   injecting liquid crystal in a specific direction between said first and second substrates to determine a first pretilt angle direction in said first alignment layer and a second pretilt angle direction in said second alignment layer resulting from the injecting direction of said liquid crystal, said first and second pretilt angle directions oriented along said first and second alignment directions, respectively.

2. The method in accordance with claim 1, wherein said first and second alignment layers include polysiloxanecinnamate.

3. The method in accordance with claim 1, wherein said first alignment direction and said second alignment direction differ by an angle, said angle is larger than 0° and smaller than 180°.

4. The method in accordance with claim 1, wherein said first pretilt angle direction has a first alignment angle $\theta_1$ relative to a reference direction, and said second pretilt angle direction has a second alignment angle $\theta_2$ relative to said reference direction; and wherein $90° \leq \theta_1 \leq 180°$, and $0° \leq \theta_2 \leq 90°$.

5. The method in accordance with claim 1, wherein said first pretilt angle direction has a first alignment angle $\theta_1$ relative to a reference direction, and said second pretilt angle direction has a second alignment angle $\theta_2$ relative to said reference direction; and wherein $0° \leq \theta_1 \leq 90°$, and $90° \leq \theta_2 \leq 0°$.

6. The method in accordance with claim 1, further comprising:

adjusting intensities of said first and second polarized UV lights to control anchoring energies of said first and second alignment layers, respectively.

7. The method in accordance with claim 6, wherein the anchoring energy of said first alignment layer is different than the anchoring energy of said second alignment layer.

8. The method in accordance with claim 1, further comprising:

adjusting intensities of said first and second polarized UV lights to control sizes of pretilt angles in said first and second alignment layers, respectively.

9. A method for manufacturing a twisted nematic liquid crystal display device including a first alignment layer provided on a first substrate and a second alignment layer provided on a second substrate, said method comprising:

irradiating a first domain of said first alignment layer with a first polarized UV light to impart a first alignment direction to said first domain of said first alignment layer;

irradiating a first domain of said second alignment layer with a second polarized UV light to impart a second alignment direction to said first domain of said second alignment layer;

irradiating a second domain of said first alignment layer with a third polarized UV light to impart a third alignment direction to said second domain of said first alignment layer;

irradiating a second domain of said second alignment layer with a fourth polarized UV light to impart a fourth alignment direction to said second domain of said second alignment layer; and injecting liquid crystal in a specific direction between said first and second substrates to determine a first pretilt angle direction in said first domain of said first alignment layer, a second pretilt angle direction in said first domain of said second alignment layer, a third pretilt angle direction in said second domain of said first alignment layer, and a fourth pretilt angle direction in said second domain of said second alignment layer resulting from the injecting direction of said liquid crystal, said first, second, third, and fourth pretilt angle directions oriented along said first, second, third, and fourth alignment directions, respectively.

10. The method in accordance with claim 9, wherein said first and second alignment layers include polysiloxanecinnamate.

11. The method in accordance with claim 9, wherein said first alignment direction, said second alignment direction, and said third alignment direction, fourth alignment direction respectively differ by an angle, said angle is larger than 0° and smaller than 180°.

12. The method in accordance with claim 9, wherein said first pretilt angle direction has a first alignment angle $\theta_1$ relative to a reference direction, said second pretilt angle direction has a second alignment angle $\theta_2$ relative to said reference direction, said third pretilt angle direction has a third alignment angle $\theta_3$ relative to said reference direction, and said fourth pretilt angle direction has a fourth alignment angle $\theta_4$ relative to said reference direction; and wherein $0° \leq \theta_1 \leq 90°$, $270° \leq \theta_2 \leq 360°$, $90° \leq \theta_3 \leq 180°$, and $0° \leq \theta_4 \leq 90°$.

13. The method in accordance with claim 9, further comprising:

adjusting intensities of said first, second, third, and fourth polarized UV lights to control anchoring energies of said first and second domains of said first and second alignment layers, respectively.

14. The method in accordance with claim 13, wherein the anchoring energies of said first and second domains of said first alignment layer are different than the anchoring energies of said first and second domains of said second alignment layer, respectively.

15. The method in accordance with claim 9, wherein said first pretilt angle direction has a first alignment angle $\theta_1$ relative to a reference direction, said second pretilt angle direction has a second alignment angle $\theta_2$ relative to said reference direction, said third pretilt angle direction has a third alignment angle $\theta_3$ relative to said reference direction, and said fourth pretilt angle direction has a fourth alignment angle $\theta_4$ relative to said reference direction; and wherein $0° \leq \theta_1 \leq 90°$, $270° \leq \theta_2 \leq 360°$, $180° \leq \theta_3 \leq 270°$, and $90° \leq \theta_4 \leq 180°$.

16. The method in accordance with claim 9, wherein said first pretilt angle direction has a first alignment angle $\theta_1$ relative to a reference direction, said second pretilt angle direction has a second alignment angle $\theta_2$ relative to said reference direction, said third pretilt angle direction has a third alignment angle $\theta_3$ relative to said reference direction, and said fourth pretilt angle direction has a fourth alignment angle $\theta_4$ relative to said reference direction; and wherein $90° \leq \theta_1$, $0° \leq \theta_2$, $\theta_3 \leq 180°$, and $\theta_4 \leq 90°$.

17. The method in accordance with claim 9, further comprising:

adjusting intensities of said first, second, third, and fourth polarized UV lights to control sizes of pretilt angles in said first and second domains of said first and second alignment layers, respectively.

* * * * *